United States Patent

[11] 3,559,839

| [72] | Inventor | Raymond Joseph Seethaler<br>2044 N. Willis Blvd., Portland, Oreg. 97217 |
|---|---|---|
| [21] | Appl. No. | 793,858 |
| [22] | Filed | Jan. 24, 1969 |
| [45] | Patented | Feb. 2, 1971 |

[54] PRESSURE COOKER WITH HEAT ACTIVATED SAFETY LOCK
7 Claims, 3 Drawing Figs.

[52] U.S. Cl. ..................................................... 220/40, 220/55
[51] Int. Cl. .......................................................... B65d 41/06
[50] Field of Search............................................ 220/40, 40S, 55, 55PC; 292/U-376, 377; 49/1

[56] References Cited
UNITED STATES PATENTS
2,734,281  2/1956  Kauffman.
FOREIGN PATENTS
79,557  8/1949  Norway........................ 220/40(S)

*Primary Examiner*—George T. Hall
*Attorney*—Eugene M. Eckelman

ABSTRACT: A safety lock wherein the handles of a pressure cooker of the type having a turn off lid are locked together as long as the temperature of the pressure cooker is above a selected minimum to prevent premature opening of the cooker. One of the handles has a heat expandable element provided with a lock pin capable of engaging a latch opening in the other handle under raised temperatures for locking the handles against rotation. The lock pin has a colored end portion by means of which the position of the lock pin is easily visible.

PATENTED FEB 2 1971          3,559,839

RAYMOND J. SEETHALER
INVENTOR

BY Eugene M. Eckelman
ATTY.

PRESSURE COOKER WITH HEAT ACTIVATED SAFETY LOCK

BACKGROUND OF THE INVENTION

This invention relates to new and useful improvements in safety locking means for pressure cookers.

Often the user of a pressure cooker opens the cooker before the heat and pressure have been dissipated and the lid as well as contents of the cooker may be propelled outwardly and endanger the user and nearby persons. Pressure cookers have heretofore been provided with safety lock means controlled by pressure within the cooker. Heat and pressure within the cooker vary at substantially the same rate whereby when the heat is dissipated the pressure likewise is dissipated. Therefore, in order to provide a much more simplified and inexpensive safety lock means for pressure cookers, the present invention has as its primary objective to provide a safety lock controlled by the heat of the cooker.

A more particular object is to provide a safety lock of the type described having a heat expandable member which is mounted in one handle and which operates a lock pin arranged to engage in a latch opening in the other handle upon a selected expansion of the heat expandible member.

Another object is to provide visible indicating means on the lock pin so that the operator can determine the position of the lock pin.

The invention will be better understood and additional objects and advantages will become apparent from the following description which illustrates a preferred form of the device.

DETAILED DESCRIPTION OF THE PREFERRED EMBODIMENT

Referring now in particular to the drawings, the numeral 10 designates the lower or kettle portion of a pressure cooker assembly and the numeral 12 designates the upper or lid portion. The lid portion 12 in the usual construction has a pressure selector and regulator valve 14 associated therewith for controlling the pressure within the cooker.

Figure 1:
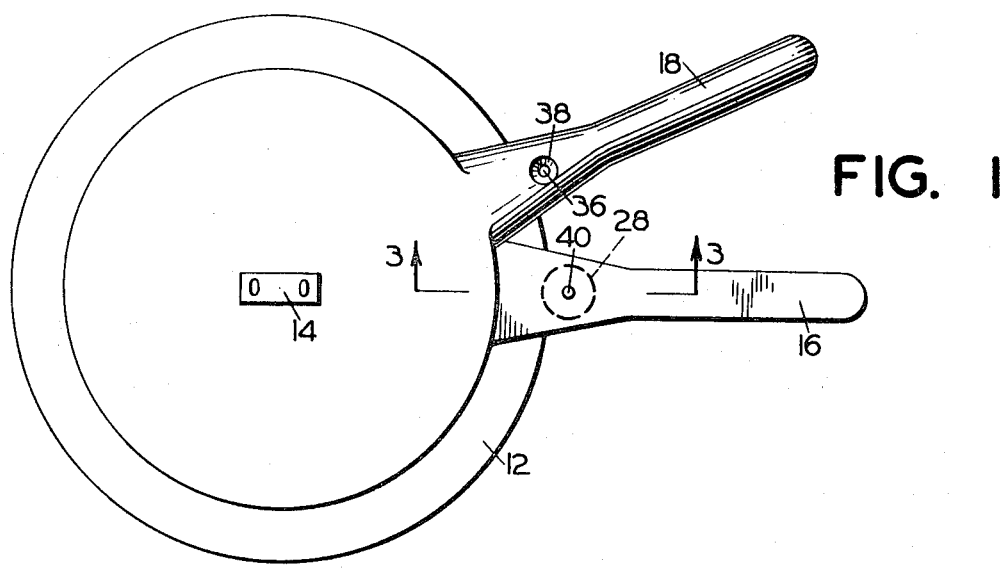
FIG. 1 is a top plan view of a pressure cooker utilizing the present safety lock.
Figure 2:
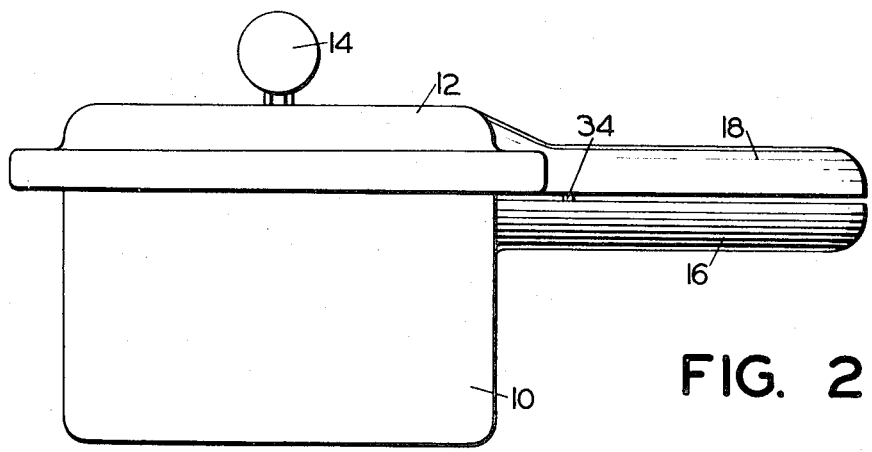
FIG. 2 is a side elevational of such pressure cooker and lock.
Figure 3:
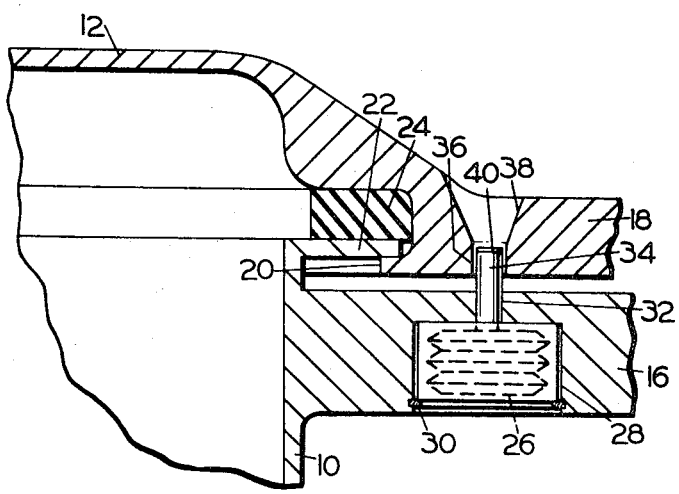
FIG. 3 is an enlarged fragmentary sectional view showing the lock mechanism in detail.

The kettle portion of the pressure cooker has a handle 16 and the lid portion 12 has a handle 18. With reference to FIG. 3, the kettle portion 10 and lid portion 12 have interlocking tabs or flanges 20 and 22, respectively, which as is well known are adapted to be disposed in locked engagement when the handles are in vertical alignment as in FIG. 2. The tabs 20, 22 are unlocked by rotation of the lid 12 to the position shown in FIG. 1. A sealing gasket 24 is disposed between the lid and kettle portions. It is customary for the user to remove the pressure selector and regulator valve 14 to relieve the pressure before removing the lid. However, as stated above and contrary to directions sometimes the cover is removed before the heat and pressure are dissipated or else the safety valve has become plugged or is faulty.

The safety lock of the present invention depends entirely for its operation on the temperature of the pressure cooker and comprises a heat expandable member 26, such as a bellows type thermostat, mounted in a recess 28 in the lower surface of handle 16. This thermostat is held in the recess by a lock ring 30. The bellows 26 are of well-known construction whereby upon the application of heat they expand and upon cooling they contract. An opening 32 extends upwardly from the recess 28 and slidably receives a locking finger or pin 34 secured to and movable with the upper end of the bellows 26. Pin 34 may or may not comprise an integral part of the bellows but preferably is connected thereto so that when the bellows contract such pin will positively be retracted.

The parts are dimensioned and arranged such that when the bellows 26 are expanded by heat the pin 34 moves upwardly into engagement with a latch opening 36 in the bottom surface of the handle of the lid portion 12, such pin when engaged in the opening 36 locking the handles against rotation and thus preventing the pressure cooker from being opened. The parts are further dimensioned and arranged such that when the bellows are retracted in a cooled condition of the pressure cooker, the top end of the lock pin 34 is disposed below the bottom surface of the handle 18 in order that rotation can be accomplished.

It is desired that the lock pin 34 be visible from the upper portion of the pressure cooker to determine its position, and for this purpose the opening 36 has a flared upper extension 38 which opens through the top surface of handle 18. The user can tell approximately the position of the safety lock by viewing it through the flared opening extension 38. To make the lock pin more clearly visible down in the opening, the upper end thereof is provided with a colored surface or tip end 40. The portion of the handle 16 which houses the bellows 26 is of heat conductive metal in order that the bellows will be accurately responsive to the heat of the kettle, and for this purpose the handle may comprise a molded part of the kettle as shown or at least would be in contact therewith to provide good heat transfer from the kettle to the handle.

According to the present invention the pressure cooker thus cannot be opened until the temperature thereof has been lowered to a selected value and more particularly to a value which is known to be safe for opening. If the handles are locked together, a further length of time must be allowed for cooling of the cooker. By visual inspection of the top end of the lock pin 34, namely the position of the tip end 40 thereof, the user can determine approximately when the pin has dropped sufficiently to allow the lid to be removed. Of course, it is always possible for the operator to look directly into the space between the two handle portions to determine the position of the pin.

It is to be understood that the form of my invention herein shown and described is to be taken as a preferred example of the same and that various changes in the shape, size and arrangement of parts may be resorted to without departing from the spirit of my invention or the scope of the subjoined claims.

I claim:

1. A pressure cooker comprising:
   a. a kettle portion;
   b. a lid portion arranged for locked engagement with said kettle portion by rotative movement; and
   c. and heat responsive lock means in one of said kettle and lid portions arranged to lock said lid portion in its locked engagement with the kettle portion until the latter has reached a selected lowered temperature whereby said lid portion cannot be removed until such lowered temperature is reached.

2. The pressure cooker of claim 1 wherein:
   a. said heat responsive lock means includes a thermostat and a lock pin movable by said thermostat; and
   b. said thermostat being expandable as said heat increases to move said lock pin into lock position and being retractable as said heat decreases to move said pin to unlocked position.

3. The pressure cooker of claim 1 wherein:
   a. said heat responsive lock means includes a bellows-type thermostat and a lock pin movable by said thermostat; and
   b. said thermostat being expandable as said heat increases to move said lock pin into lock position and being retractable as said heat decreases to move said pin to unlocked position.

4. The pressure cooker of claim 1 wherein:
   a. said kettle and lid portions have handle members;
   b. said heat responsive lock means including a thermostat supported in one of the handle members of the kettle and lid portions;
   c. a lock pin movable by said thermostat;

d. said lock pin being normally retracted within the said handle member in which it is supported but being extendable out of its handle member under raised temperature conditions; and e. and means defining a latch opening in the other handle member arranged for engagement by said lock pin in a lock position of the latter.

5. The pressure cooker of claim 1 wherein:

a. said lid and kettle portions have handle members;

b. said heat responsive lock means including a thermostat supported in the handle member of said kettle portion;

c. a lock pin movable by said thermostat;

d. said lock pin being normally retracted within the said handle member of the kettle portion but being extendable out of said handle member under raised temperature conditions; and e. and means defining a latch opening in said handle member of the lid portion arranged for engagement by said lock pin in a lock position of the latter.

6. The pressure cooker of claim 4 wherein said latch opening extends through said handle member of the lid portion and said lock pin is visible therethrough whereby the operator can visually determine the position of the lock pin.

7. The pressure cooker of claim 4 wherein:

a. said latch opening extends through said handle member of the lid portion and said lock pin is visible therethrough whereby the operator can visually determine the position of the lock pin; and b. said lock pin having a colored end portion to make it more visible.